US012232214B2

(12) United States Patent
Shi et al.

(10) Patent No.: US 12,232,214 B2
(45) Date of Patent: Feb. 18, 2025

(54) METHOD AND APPARATUS FOR PROSE PEER DISCOVERY

(71) Applicant: INTERDIGITAL PATENT HOLDINGS, INC., Wilmington, DE (US)

(72) Inventors: Xiaoyan Shi, Westmount (CA); Michelle Perras, Montreal (CA); Samir Ferdi, Kirkland (CA); Saad Ahmad, Montreal (CA)

(73) Assignee: INTERDIGITAL PATENT HOLDINGS, INC., Wilmington, DE (US)

( * ) Notice: Subject to any disclaimer, the term of this patent is extended or adjusted under 35 U.S.C. 154(b) by 294 days.

(21) Appl. No.: 17/764,607

(22) PCT Filed: Oct. 5, 2020

(86) PCT No.: PCT/US2020/054266
§ 371 (c)(1),
(2) Date: Mar. 29, 2022

(87) PCT Pub. No.: WO2021/067937
PCT Pub. Date: Apr. 8, 2021

(65) Prior Publication Data
US 2022/0360967 A1     Nov. 10, 2022

Related U.S. Application Data

(60) Provisional application No. 62/910,201, filed on Oct. 3, 2019.

(51) Int. Cl.
*H04W 8/00*     (2009.01)
*H04L 5/00*     (2006.01)
*H04W 24/08*     (2009.01)

(52) U.S. Cl.
CPC ........... *H04W 8/005* (2013.01); *H04L 5/0053* (2013.01); *H04W 24/08* (2013.01)

(58) Field of Classification Search
CPC ...... H04W 8/005; H04W 24/08; H04L 5/0053
See application file for complete search history.

(56) References Cited

U.S. PATENT DOCUMENTS 9,479,905 B2    10/2016    Stephens et al.
9,813,842 B2    11/2017    Ahmad et al.
(Continued)

FOREIGN PATENT DOCUMENTS

EP    3 043 619     7/2016
WO    2016/054526     4/2016

OTHER PUBLICATIONS

Huawei et al., "Target UE Restricted ProSe Direct Discovery," SA WG2 Meeting #105, S2-143644, Sapporo, Japan (Oct. 13-17, 2014).
(Continued)

*Primary Examiner* — Jamal Javaid
(74) *Attorney, Agent, or Firm* — Volpe Koenig

(57) ABSTRACT

A method and apparatus where an announcing WTRU may request peer discovery from a Pro Se function, and the ProSe function may provide information associated with a monitoring WTRU to the announcing WTRU as a result of the monitoring WTRU having discovered the announcing WTRU. A discoveree WTRU may request peer discovery from a ProSe function where the ProSe function sends a unique ProSe query code to a discoverer WTRU. As a result of the discoveree WTRU detecting the ProSe query code on radio interface, the discoveree WTRU triggers a match report procedure to obtain information associated with the Discoverer WTRU.

12 Claims, 9 Drawing Sheets

(56) References Cited

U.S. PATENT DOCUMENTS

| | | | |
|---|---|---|---|
| 10,028,208 | B2 | 7/2018 | Enomoto et al. |
| 2002/0143944 | A1* | 10/2002 | Traversat ............... H04L 67/107 709/225 |
| 2014/0162644 | A1 | 6/2014 | Ou |
| 2015/0312718 | A1* | 10/2015 | Stephens ................. H04L 67/51 455/456.2 |
| 2016/0073251 | A1 | 3/2016 | Liao |
| 2016/0295347 | A1 | 10/2016 | Ahmad et al. |
| 2017/0257751 | A1 | 9/2017 | Atarius et al. |
| 2018/0213385 | A1 | 7/2018 | Aminaka et al. |

OTHER PUBLICATIONS

IEEE Standard for Information technology—Telecommunications and information exchange between systems—Local and metropolitan area networks—Specific requirements; Part 11: Wireless LAN Medium Access Control (MAC) and Physical Layer (PHY) Specifications, IEEE Std. 802.11-2016 (Dec. 7, 2016).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 4: Enhancements for Very High Throughput for Operation in Bands below 6GHZ, IEEE Std 802.11ac-2013 (Dec. 11, 2013).

IEEE Standard for Information Technology—Telecommunications and information exchange between systems—Local and metropolitan area networks—Specific requirements; Part 11: Wireless LAN Medium Access Control (MAC) and Physical Layer (PHY) specifications; Amendment 5: Television White Spaces (TVWS) Operation, IEEE 802.11af-2013 (Dec. 11, 2013).

IEEE Standard for Information technology—Telecommunications and information exchange between systems—Local and metropolitan area networks—Specific requirements; Part 11: Wireless LAN Medium Access Control (MAC) and Physical Layer (PHY) Specifications; Amendment 5: Enhancements for Higher Throughput, IEEE Std 802.11n-2009 (Sep. 2009).

IEEE Standard for Information technology—Telecommunications and information exchange between systems Local and metropolitan area networks—Specific requirements; Part 11: Wireless LAN Medium Access Control (MAC) and Physical Layer (PHY) Specifications; Amendment 2: Sub 1 GHz License Exempt Operation, IEEE 802.11ah-2016 (Dec. 7, 2016).

Interdigital Inc., "New Key Issue: Support of ProSe direct discovery in 5GS," SA WG2 Meeting #135, S2-1909923, Split, Croatia (Oct. 14-18, 2019).

Third Generation Partnership Project, "Technical Specification Group Services and System Aspects; Proximity-based services (ProSe); Stage 2 (Release 15)," 3GPP TS 23.303 V15.1.0 (Jun. 2018).

Third Generation Partnership Project, "Technical Specification Group Services and System Aspects; Proximity-based services (ProSe); Stage 2 (Release 16)," 3GPP TS 23.303 V16.0.0 (Jul. 2020).

Third Generation Partnership Project, "Technical Specification Group Services and System Aspects; System Architecture for the 5G System (5GS); Stage 2 (Release 16)," 3GPP TS 23.501 V16.2.0 (Sep. 2019).

Third Generation Partnership Project, "Technical Specification Group Services and System Aspects; System Architecture for the 5G System; Stage 2 (Release 16)," 3GPP TS 23.501 V16.0.0 (Mar. 2019).

Third Generation Partnership Project, "Technical Specification Group Services and System Aspects; System architecture for the 5G System (5GS); Stage 2 (Release 16)," 3GPP TS 23.501 V16.6.0 (Sep. 2020).

Third Generation Partnership Project, "Technical Specification Group Services and System Aspects; Procedures for the 5G System; Stage 2 (Release 16)," 3GPP TS 23.502 V16.0.0 (Mar. 2019).

Third Generation Partnership Project, "Technical Specification Group Services and System Aspects; Procedures for the 5G System (5GS); Stage 2 (Release 16)," 3GPP TS 23.502 V16.2.0 (Sep. 2019).

Third Generation Partnership Project, "Technical Specification Group Services and System Aspects; Procedures for the 5G System (5GS); Stage 2 (Release 16)," 3GPP TS 23.502 V16.6.0 (Sep. 2020).

* cited by examiner

METHOD AND APPARATUS FOR PROSE PEER DISCOVERY

CROSS-REFERENCE TO RELATED APPLICATIONS

This application is the U.S. National Stage, under 35 U.S.C. § 371, of International Application No. PCT/US2020/054266 filed Oct. 5, 2020, which claims the benefit of U.S. Provisional Application No. 62/910,201, filed Oct. 3, 2019, the contents of which are incorporated herein by reference.

BACKGROUND

Proximity services (ProSe) enable network assisted discovery of users in close physical proximity and facilitate direct communication between those users, where and/or if appropriate. Direct communication involves a radio connection established between the users' wireless communication devices without transiting via the network. ProSe may save network resources, permit public safety communication when network coverage is unavailable, social networking, file transfer, and other services between devices.

Current ProSe direct discovery procedures only support one-direction discovery. However, in many use cases, two-discovery is desired wherein all wireless transmit/receive units (WTRUs) can discover other WTRUs. However, this can cause massive signaling and significant radio resource consumption.

SUMMARY

A method and system are described for two-way ProSe discovery wherein a WTRU can both send an announce request and receive a monitor response. For example, in one embodiment, a method is implemented in a first WTRU, the method comprising: sending an announce request to a node residing in a cellular core network; the announce request including an indication that the first WTRU is requesting peer node discovery and an indication that the first WTRU is anonymously discoverable; and sending a ProSe app code to enable a second WTRU to discover the first WTRU. In another embodiment, a method is implemented in a first WTRU, the method comprising: sending a monitor request to a node residing in a cellular core network; the monitor request including an indication that the first WTRU is anonymously discoverable; sending a match report to the node, including a ProSe query code; and receiving a match report acknowledgement from the node.

BRIEF DESCRIPTION OF THE DRAWINGS

A more detailed understanding may be had from the detailed description below, given by way of example in conjunction with drawings appended hereto. Figures in such drawings, like the detailed description, are examples. As such, the Figures and the detailed description are not to be considered limiting, and other equally effective examples are possible and likely. Furthermore, like reference numerals ("ref.") in the Figures ("FIGs.") indicate like elements, and wherein.

DETAILED DESCRIPTION

In the following detailed description, numerous specific details are set forth to provide a thorough understanding of embodiments and/or examples disclosed herein. However, it will be understood that such embodiments and examples may be practiced without some or all of the specific details set forth herein. In other instances, well-known methods, procedures, components and circuits have not been described in detail, so as not to obscure the following description. Further, embodiments and examples not specifically described herein may be practiced in lieu of, or in combination with, the embodiments and other examples described, disclosed or otherwise provided explicitly, implicitly and/or inherently (collectively "provided") herein.

Figure 1A:
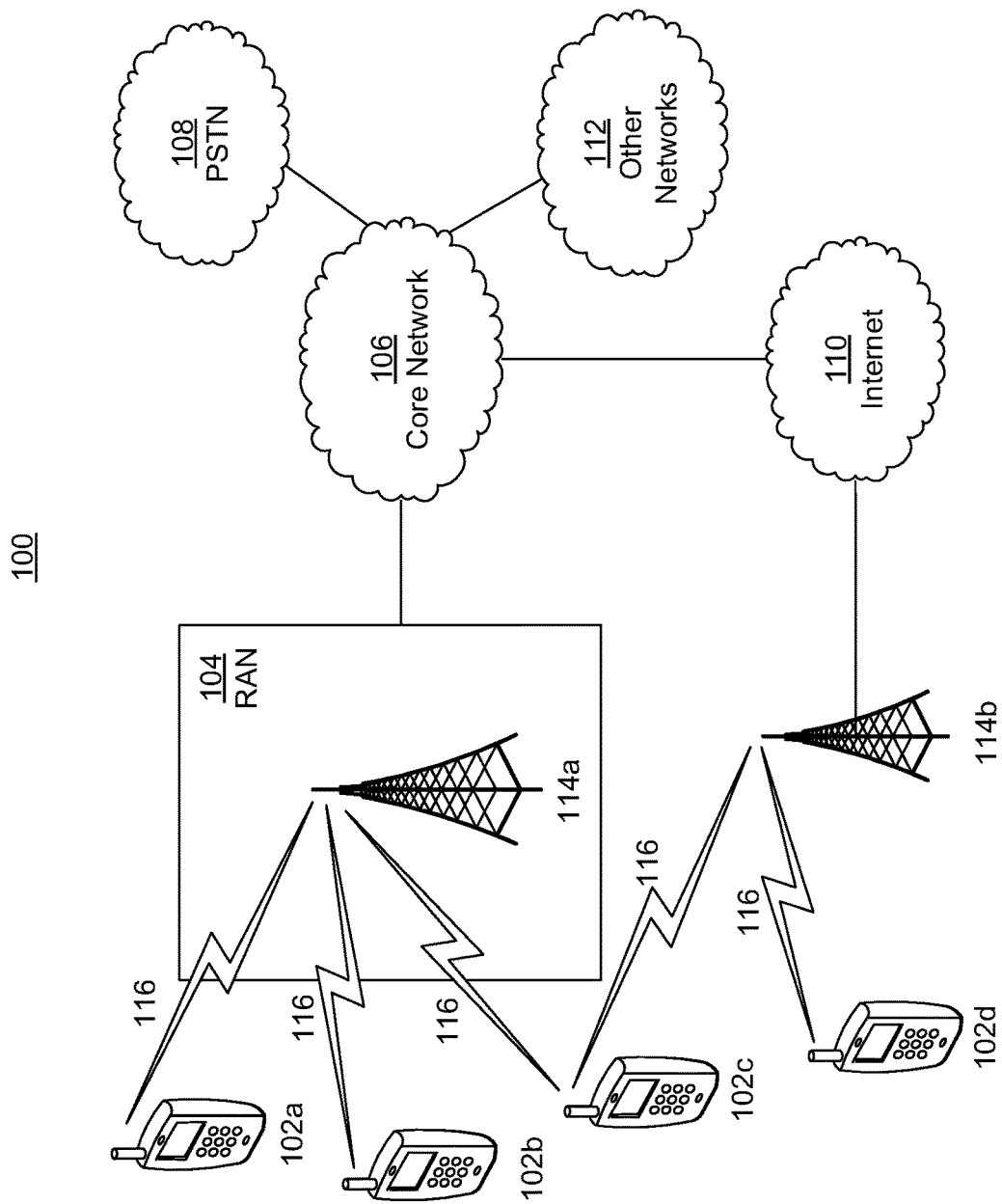
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word discrete Fourier transform Spread OFDM (ZT-UW-DFT-S-OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a radio access network (RAN) 104, a core network (CN) 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d, any of which may be referred to as a station (STA), may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106, the Internet 110, and/or the other networks 112. By way of example, the base stations 114a, 114b may be a base transceiver station (BTS), a NodeB, an eNode B (eNB), a Home Node B, a Home eNode B, a next generation NodeB, such as a gNode B (gNB), a new radio (NR) NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, and the like. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed Uplink (UL) Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access, which may establish the air interface 116 using NR.

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106.

The RAN 104 may be in communication with the CN 106, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the CN 106 may be in direct or indirect communication with other RANs that employ the same RAT as the RAN 104 or a different RAT. For example, in addition to being connected to the RAN 104, which may be utilizing a NR radio technology, the CN 106 may also be in communication with another RAN (not shown) employing a GSM, UMTS, CDMA 2000, WiMAX, E-UTRA, or WiFi radio technology.

The CN 106 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
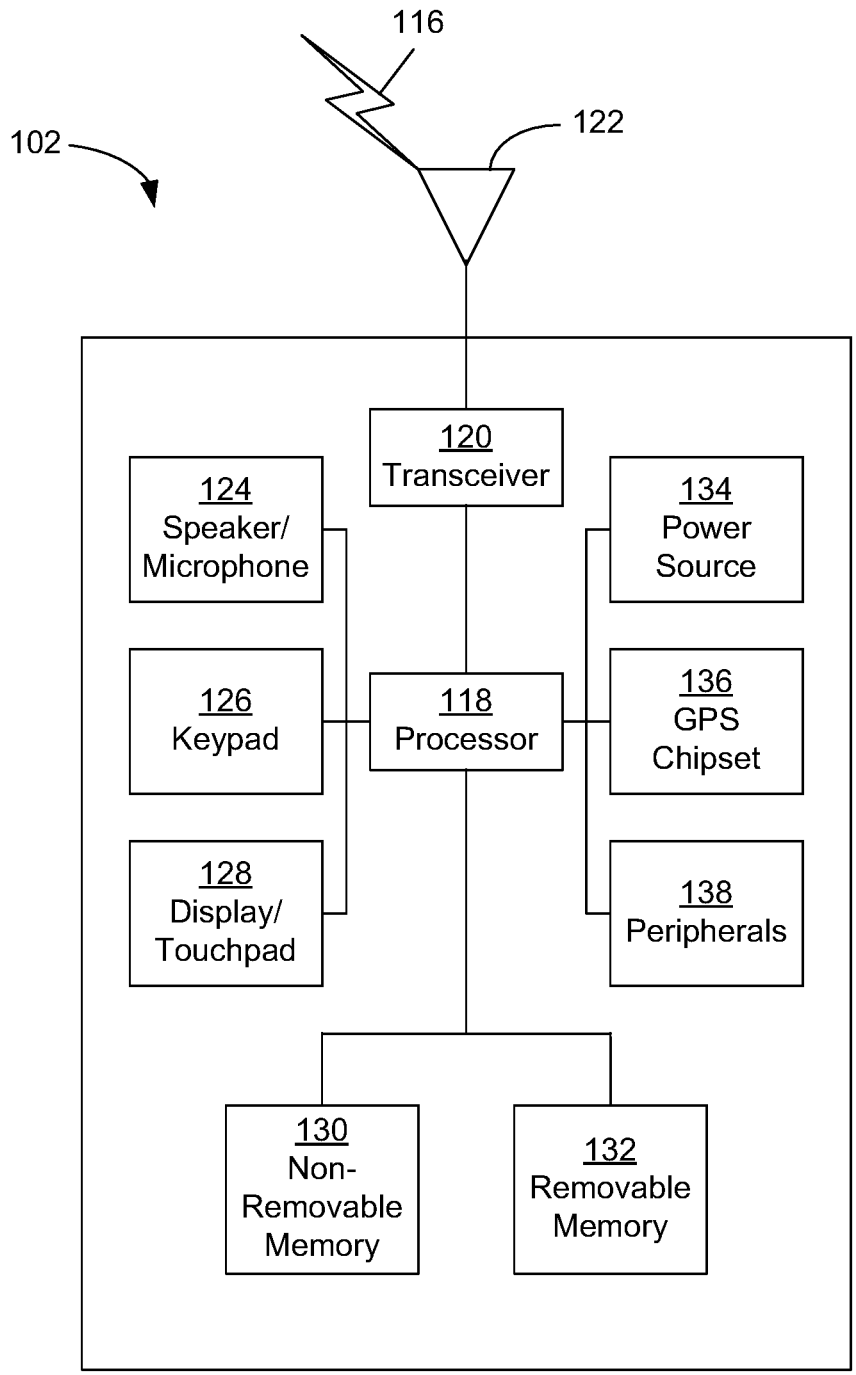
FIG. 1B is a system diagram illustrating an example wireless transmit/receive unit (WTRU) that may be used within the communications system illustrated in FIG. 1A.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs), any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors. The sensors may be one or more of a gyroscope, an accelerometer, a hall effect sensor, a magnetometer, an orientation sensor, a proximity sensor, a temperature sensor, a time sensor; a geolocation sensor, an altimeter, a light sensor, a touch sensor, a magnetometer, a barometer, a gesture sensor, a biometric sensor, a humidity sensor and the like.

The WTRU 102 may include a full duplex radio for which transmission and reception of some or all of the signals (e.g., associated with particular subframes for both the UL (e.g., for transmission) and DL (e.g., for reception) may be concurrent and/or simultaneous. The full duplex radio may include an interference management unit to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the DL (e.g., for reception)).

Figure 1C:
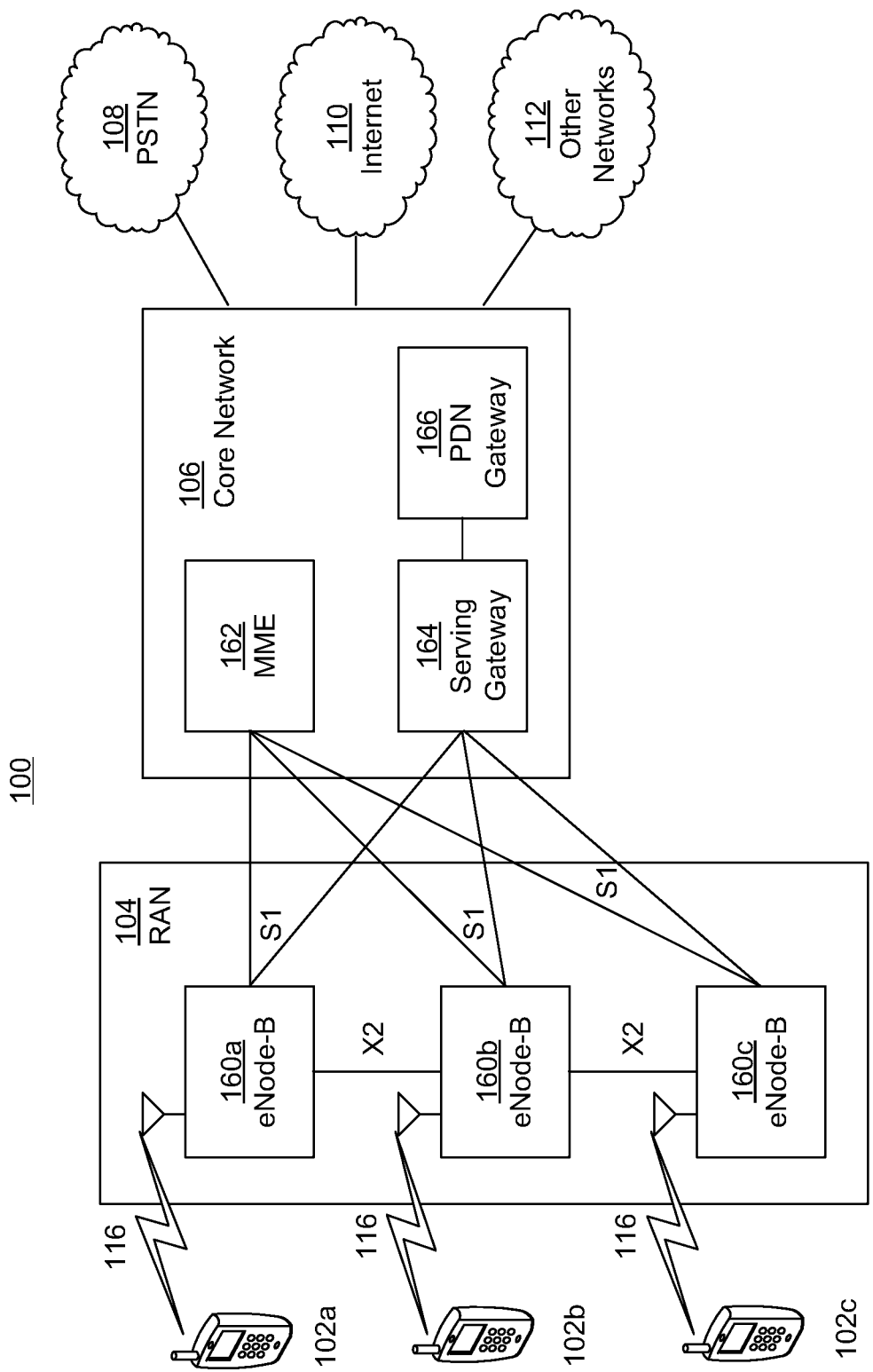
FIG. 1C is a system diagram illustrating an example radio access network (RAN) and an example core network (CN) that may be used within the communications system illustrated in FIG. 1A.

FIG. 1C is a system diagram illustrating the RAN 104 and the CN 106 according to an embodiment. As noted above, the RAN 104 may employ an E-UTRA radio technology to communicate with the WTRUs 102a, 102b, 102c over the air interface 116. The RAN 104 may also be in communication with the CN 106.

The RAN 104 may include eNode-Bs 160a, 160b, 160c, though it will be appreciated that the RAN 104 may include any number of eNode-Bs while remaining consistent with an embodiment. The eNode-Bs 160a, 160b, 160c may each include one or more transceivers for communicating with the WTRUs 102a, 102b, 102c over the air interface 116. In one embodiment, the eNode-Bs 160a, 160b, 160c may implement MIMO technology. Thus, the eNode-B 160a, for example, may use multiple antennas to transmit wireless signals to, and/or receive wireless signals from, the WTRU 102a.

Each of the eNode-Bs 160a, 160b, 160c may be associated with a particular cell (not shown) and may be configured to handle radio resource management decisions, handover decisions, scheduling of users in the UL and/or DL, and the like. As shown in FIG. 1C, the eNode-Bs 160a, 160b, 160c may communicate with one another over an X2 interface.

The CN 106 shown in FIG. 1C may include a mobility management entity (MME) 162, a serving gateway (SGW) 164, and a packet data network (PDN) gateway (PGW) 166. While the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width. The primary channel may be the operating channel of the BSS and may be used by the STAs to establish a connection with the AP. In certain representative embodiments, Carrier Sense Multiple Access with Collision Avoidance (CSMA/CA) may be implemented, for example in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz, and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications (MTC), such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode) transmitting to the AP, all available frequency bands may be considered busy even though a majority of the available frequency bands remains idle.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
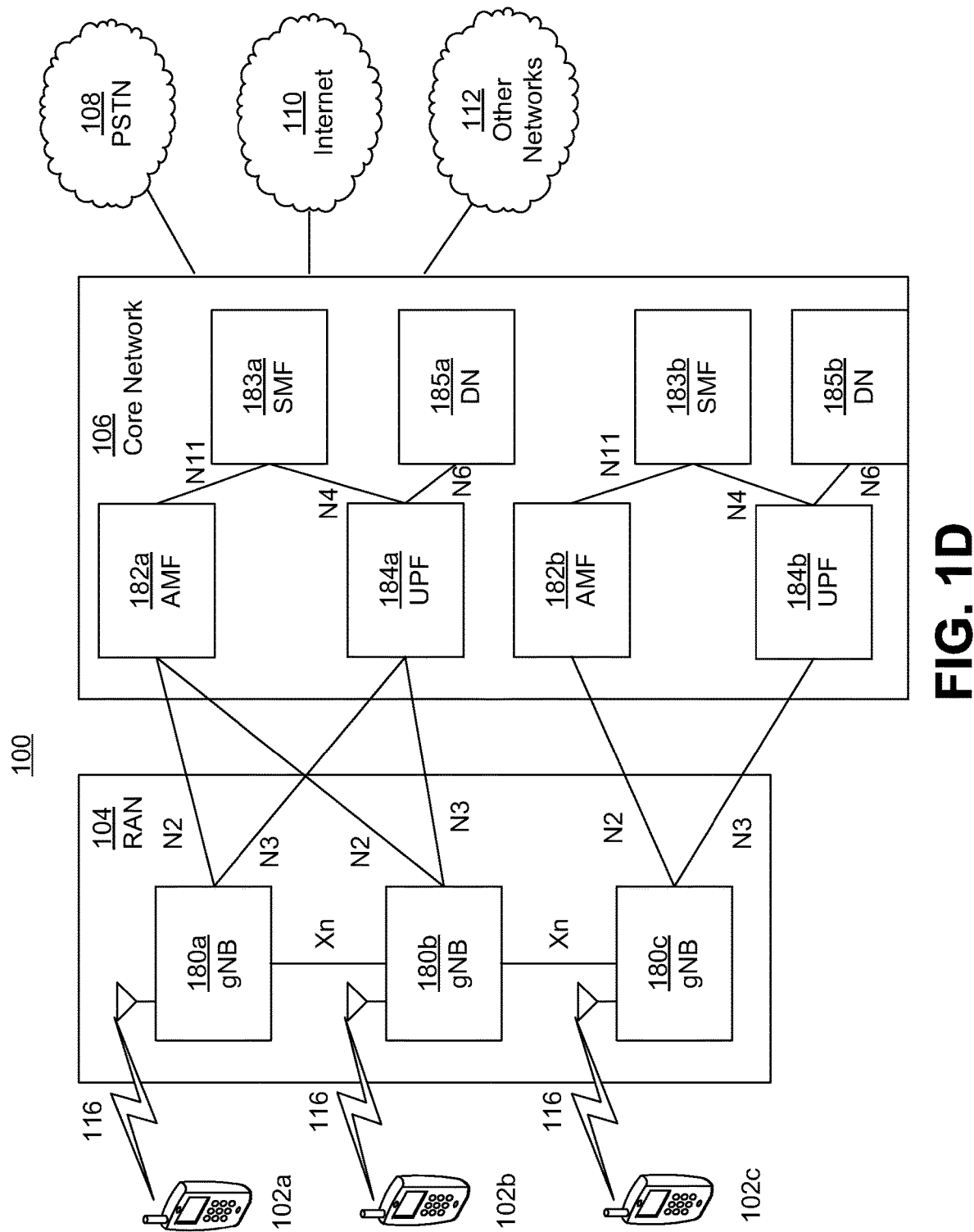
FIG. 1D is a system diagram illustrating a further example RAN and a further example CN that may be used within the communications system illustrated in FIG. 1.

FIG. 1D is a system diagram illustrating the RAN 104 and the CN 106 according to an embodiment. As noted above, the RAN 104 may employ an NR radio technology to communicate with the WTRUs 102a, 102b, 102c over the air interface 116. The RAN 104 may also be in communication with the CN 106.

The RAN 104 may include gNBs 180a, 180b, 180c, though it will be appreciated that the RAN 104 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., containing a varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160*a*, 160*b*, 160*c* substantially simultaneously. In the non-standalone configuration, eNode-Bs 160*a*, 160*b*, 160*c* may serve as a mobility anchor for WTRUs 102*a*, 102*b*, 102*c* and gNBs 180*a*, 180*b*, 180*c* may provide additional coverage and/or throughput for servicing WTRUs 102*a*, 102*b*, 102*c*.

Each of the gNBs 180*a*, 180*b*, 180*c* may be associated with a particular cell (not shown) and may be configured to handle radio resource management decisions, handover decisions, scheduling of users in the UL and/or DL, support of network slicing, DC, interworking between NR and E-UTRA, routing of user plane data towards User Plane Function (UPF) 184*a*, 184*b*, routing of control plane information towards Access and Mobility Management Function (AMF) 182*a*, 182*b* and the like. As shown in FIG. 1D, the gNBs 180*a*, 180*b*, 180*c* may communicate with one another over an Xn interface.

The CN 106 shown in FIG. 1D may include at least one AMF 182*a*, 182*b*, at least one UPF 184*a*,184*b*, at least one Session Management Function (SMF) 183*a*, 183*b*, and possibly a Data Network (DN) 185*a*, 185*b*. While the foregoing elements are depicted as part of the CN 106, it will be appreciated that any of these elements may be owned and/or operated by an entity other than the CN operator.

The AMF 182*a*, 182*b* may be connected to one or more of the gNBs 180*a*, 180*b*, 180*c* in the RAN 104 via an N2 interface and may serve as a control node. For example, the AMF 182*a*, 182*b* may be responsible for authenticating users of the WTRUs 102*a*, 102*b*, 102*c*, support for network slicing (e.g., handling of different protocol data unit (PDU) sessions with different requirements), selecting a particular SMF 183*a*, 183*b*, management of the registration area, termination of non-access stratum (NAS) signaling, mobility management, and the like. Network slicing may be used by the AMF 182*a*, 182*b* in order to customize CN support for WTRUs 102*a*, 102*b*, 102*c* based on the types of services being utilized WTRUs 102*a*, 102*b*, 102*c*. For example, different network slices may be established for different use cases such as services relying on ultra-reliable low latency (URLLC) access, services relying on enhanced massive mobile broadband (eMBB) access, services for MTC access, and the like. The AMF 182*a*, 182*b* may provide a control plane function for switching between the RAN 104 and other RANs (not shown) that employ other radio technologies, such as LTE, LTE-A, LTE-A Pro, and/or non-3GPP access technologies such as WiFi.

The SMF 183*a*, 183*b* may be connected to an AMF 182*a*, 182*b* in the CN 106 via an N11 interface. The SMF 183*a*, 183*b* may also be connected to a UPF 184*a*, 184*b* in the CN 106 via an N4 interface. The SMF 183*a*, 183*b* may select and control the UPF 184*a*, 184*b* and configure the routing of traffic through the UPF 184*a*, 184*b*. The SMF 183*a*, 183*b* may perform other functions, such as managing and allocating UE IP address, managing PDU sessions, controlling policy enforcement and QoS, providing DL data notifications, and the like. A PDU session type may be IP-based, non-IP based, Ethernet-based, and the like.

The UPF 184*a*, 184*b* may be connected to one or more of the gNBs 180*a*, 180*b*, 180*c* in the RAN 104 via an N3 interface, which may provide the WTRUs 102*a*, 102*b*, 102*c* with access to packet-switched networks, such as the Internet 110, to facilitate communications between the WTRUs 102*a*, 102*b*, 102*c* and IP-enabled devices. The UPF 184, 184*b* may perform other functions, such as routing and forwarding packets, enforcing user plane policies, supporting multi-homed PDU sessions, handling user plane QoS, buffering DL packets, providing mobility anchoring, and the like.

The CN 106 may facilitate communications with other networks. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102*a*, 102*b*, 102*c* with access to the other networks 112, which may include other wired and/or wireless networks that are owned and/or operated by other service providers. In one embodiment, the WTRUs 102*a*, 102*b*, 102*c* may be connected to a local DN 185*a*, 185*b* through the UPF 184*a*, 184*b* via the N3 interface to the UPF 184*a*, 184*b* and an N6 interface between the UPF 184*a*, 184*b* and the DN 185*a*, 185*b*.

In view of FIGS. 1A-1D, and the corresponding description of FIGS. 1A-1D, one or more, or all, of the functions described herein with regard to one or more of: WTRU 102*a-d*, Base Station 114*a-b*, eNode-B 160*a-c*, MME 162, SGW 164, PGW 166, gNB 180*a-c*, AMF 182*a-b*, UPF 184*a-b*, SMF 183*a-b*, DN 185*a-b*, and/or any other device (s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

ProSe are services that can be provided by a 3GPP system (or any other type of wireless system) based on WTRUs being in proximity to each other. Depicted in FIG. 2 is a reference model of proximity-based services.

The ProSe function comprises, for example, the following main sub-functions: direct provisioning function (DPF), which may be used to provision the WTRU with necessary parameters in order use ProSe direct discovery and ProSe direct communication; and/or, direct discovery name management function, which may be used for open ProSe direct discovery to allocate and process the mapping of ProSe applications IDs and ProSe application codes used in ProSe direct discovery.

Figure 2:
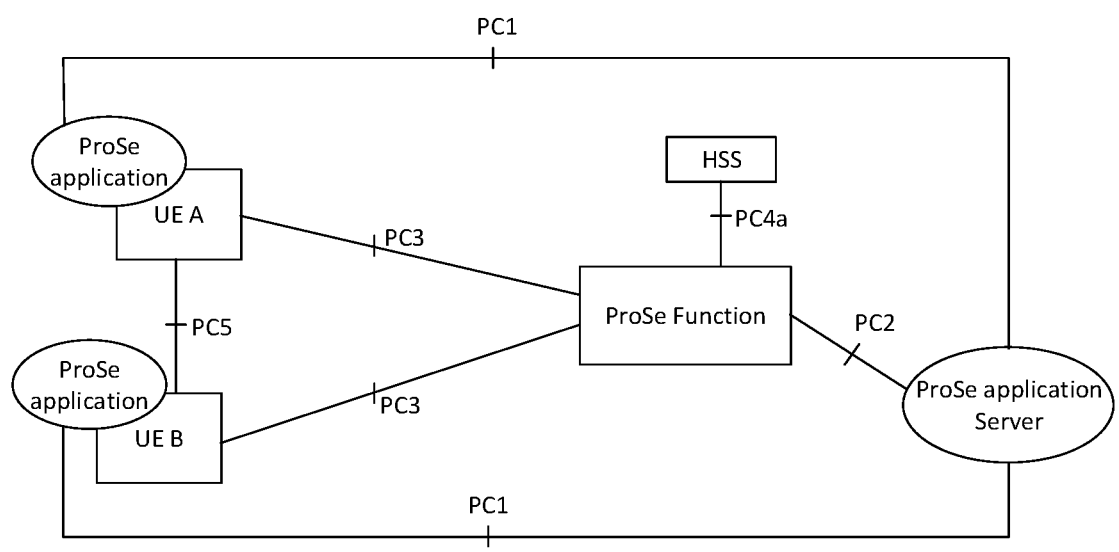
FIG. 2 is a diagram illustrating an example of a reference model of proximity-based services according to an embodiment.

A ProSe-enabled WTRU, such as a WTRU A 202a and WTRU B 202b in FIG. 2, supports, for example, the following functions: exchange of ProSe control information between a ProSe-enabled WTRU and a ProSe function over a PC3 interface; and/or, procedures for open and restricted ProSe direct discovery of other ProSe-enabled WTRUs over a PC5 interface (e.g., radio interface).

A ProSe application server 204 supports, for example, the following capability: storage of ProSe application layer information, such as mapping of application layer user IDs and network layer ProSe user IDs.

ProSe direct discovery as used herein may refer to one of various direct discovery procedures. Any of these direct discovery procedures may be based on a discovery model. Examples of the discovery model may include a Model A ("I am here") and a Model B ("who is there?"/"are you there?").

ProSe direct discovery may allow a ProSe-enabled WTRU to detect and identify another WTRU in its proximity using direct radio signals. There may be two types of ProSe direct discovery—open and restricted. In Open discovery, there is no explicit permission that is needed from the WTRU being discovered, whereas restricted discovery only takes place with explicit permission from the WTRU that is being discovered.

Figure 3:
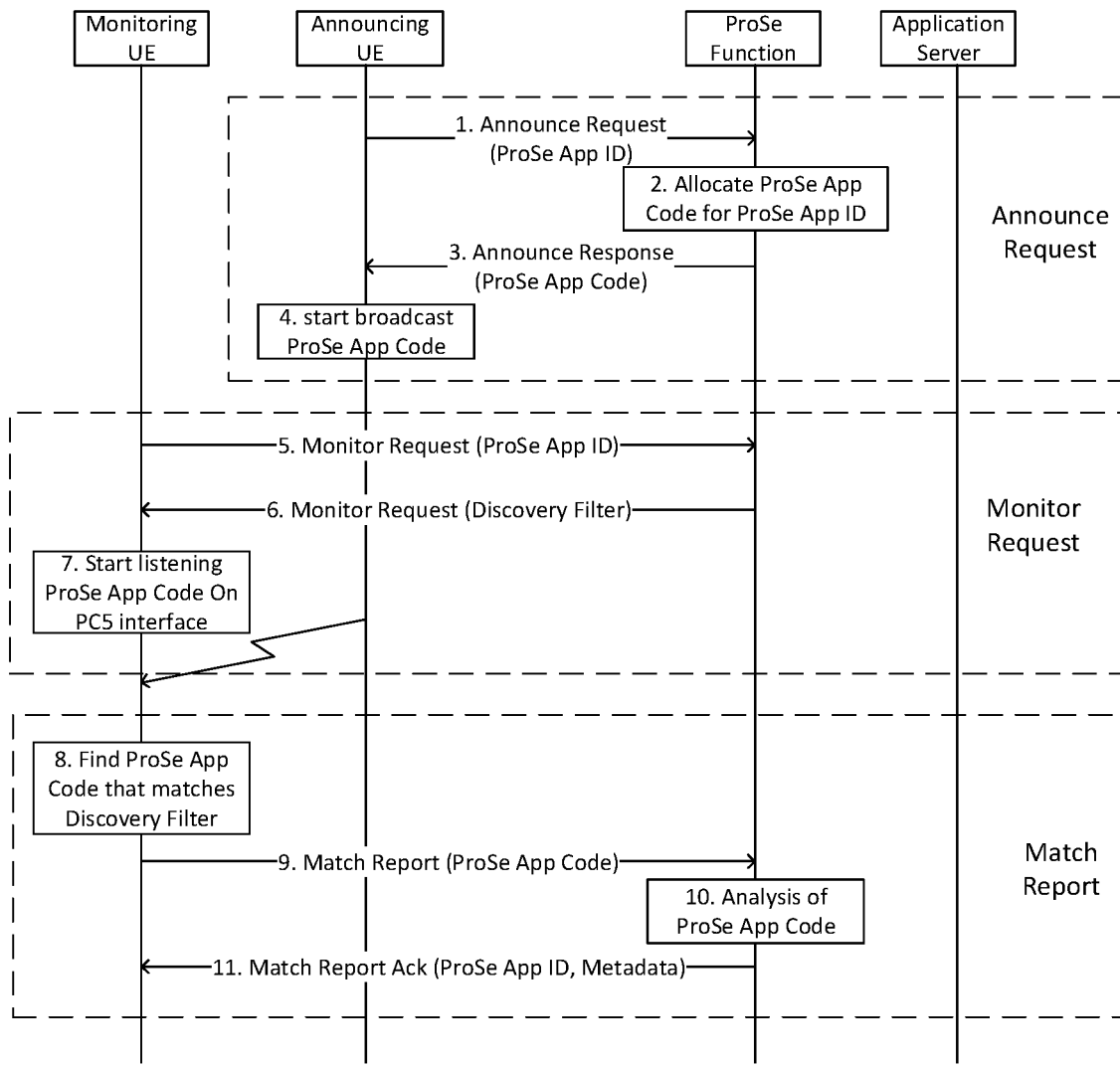
FIG. 3 is a diagram illustrating an example of a procedure of ProSe direct discovery according to an embodiment.

FIG. 3 illustrates Model A. As shown in FIG. 3, Model A defines two roles for the ProSe-enabled WTRUs that are participating in ProSe direct discovery—announcing WTRU 302, where the WTRU announces certain information that could be used by WTRUs in proximity that have permission to discover; and monitoring WTRU 304, where the WTRU monitors certain information of interest in proximity of announcing WTRUs.

In this model the announcing WTRU 302 may broadcast discovery messages and the monitoring WTRUs 304 that are interested in these messages may read and process the messages. Model A supports both open and restricted discovery.

In Model A, the announcing WTRU 302 may perform the announce request procedure. For example, the announcing WTRU 302 sends ProSe app ID 306 to ProSe function 310 to indicate which ProSe service to announce. After receiving a ProSe app code 308 for the ProSe app ID 306, the announcing WTRU 302 broadcasts the ProSe app code 308 on a PC5 interface.

The monitoring WTRU 304 may perform a monitor request procedure. For example, the monitoring WTRU 304 sends ProSe app ID 306 to ProSe function 310 to indicate which ProSe service is to be monitored. After receiving a discovery filter which contains the ProSe app code 308 for the ProSe app ID 306, the monitoring WTRU 304 listens for the ProSe app code 308 on the PC5 interface.

Once the monitoring WTRU 304 detects the ProSe app code 308 on a PC5 interface which matches the discovery filter, the monitoring WTRU 304 may perform a match report procedure to get metadata of the ProSe service (e.g., phone number or URL of a restaurant).

Figure 4:
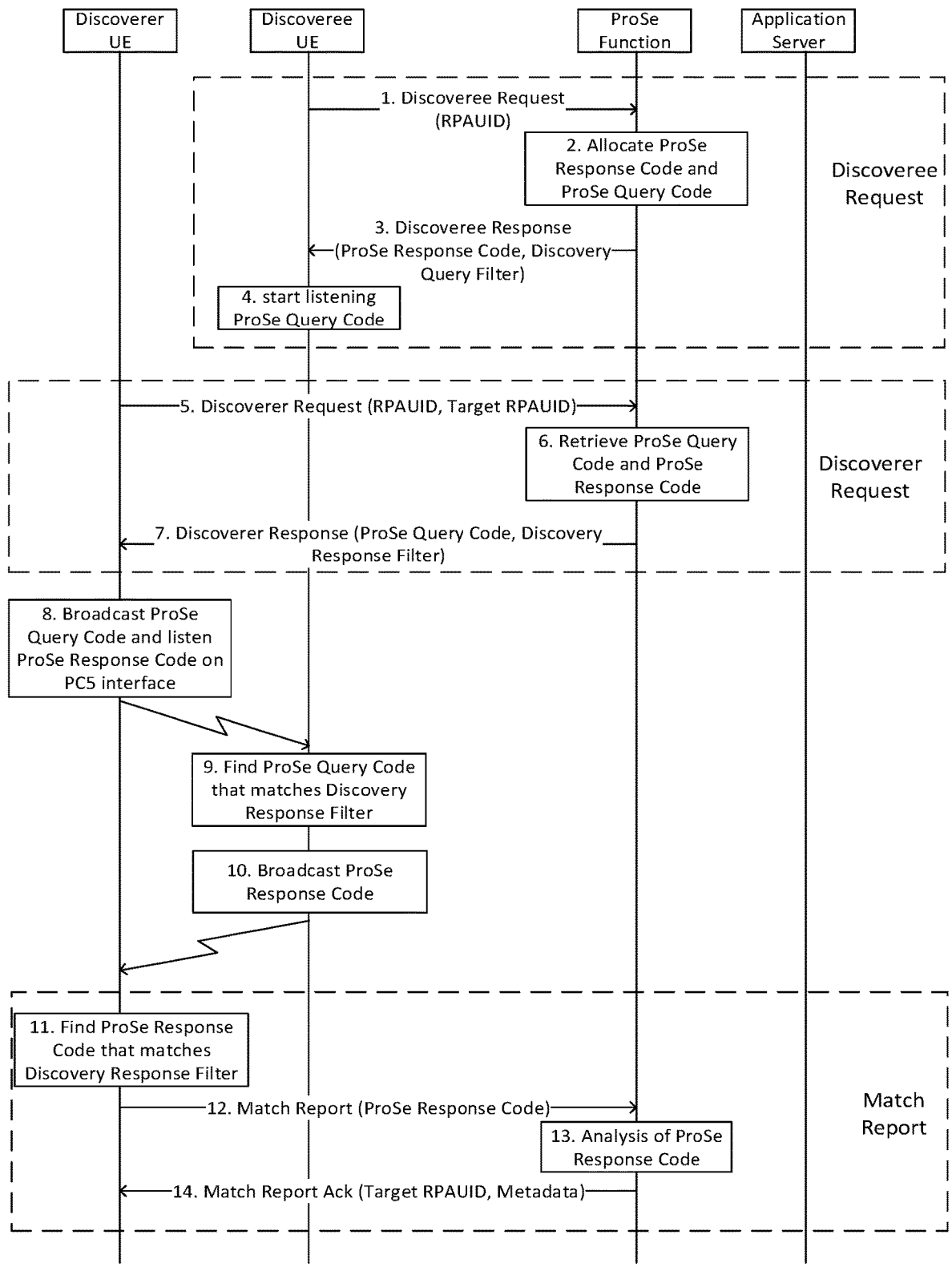
FIG. 4 is a diagram illustrating an example of a procedure of ProSe direct discovery according to an embodiment.

FIG. 4 illustrates Model B. Model B may be for cases when restricted discovery type is used. Model B may define two roles for the ProSe-enabled WTRUs that are participating in ProSe direct discovery: discoverer WTRU 402, where the WTRU transmits a request containing certain information about what it is interested to discover, and discoveree WTRU 404, where the WTRU that receives the request message can respond with some information related to the discoverer's request.

Model B may only support restricted discovery. In Model B, the discoveree WTRU 404 may perform the discoveree request procedure. For example, the discoveree WTRU 404 sends its RPAU ID (e.g., Restricted ProSe Application User ID) 406 to ProSe function 408 and receives a discoveree response 410 which may include a ProSe response code and discovery query filter (which contains the ProSe query code) for the RPAUID. Then the discoveree WTRU 404 listens for the ProSe query code on a PC5 interface.

The discoverer WTRU 404 may perform the discoverer request procedure. For example, the discoverer WTRU 404 sends its RPAUID and target RPAUID to ProSe function 408 to indicate which target ProSe user to be discovered. After receiving a ProSe query code and a discovery response filter which contains the ProSe response code of the target RPAUID, the discoverer WTRU 402 broadcasts ProSe query code on the PC5 interface.

Once the discoveree WTRU 404 detects the ProSe query code on PC5 interface which matches the discovery query filter, the discoveree WTRU 404 responds with a ProSe response code. Once the discoverer WTRU 404 detects the ProSe response code on PC5 interface which matches the Discovery response filter, the discoverer WTRU 402 may perform a match report procedure in order to get the RPAU ID's metadata.

Current ProSe direct discovery procedures only support one-direction discovery, such as the monitoring WTRU 304 discovers the announcing WTRU 306 or the discoverer WTRU 402 discovers the discoveree WTRU 404. However, in many use cases, the announcing WTRU 306/discoveree WTRU 404 may also want to discover a peer node, such as the monitoring WTRU 304/discoverer WTRU 402.

For example, if a store wants a potential customer to find the store when the customer in its proximity, the store's WTRU must act as an announcing WTRU and the customers' WTRUs must act as monitoring WTRUs. However, the store (e.g., announcing WTRU) may also want to know "by who", "when," and "how often" it is being discovered (for example, in order to adjust its business strategy). This scenario is not be possible under Model A.

In another use case, a group of people would like to join another group of people who are playing an interactive game via their WTRUs. In order to join them, the new WTRUs need to be able to find the other WTRUs and the other WTRUs must be able to find the new WTRUs.

In order to support the use cases mentioned above, one approach, for example, is that all WTRUs play both announcing/discoveree WTRU and monitoring/discoverer WTRU. However, this may cause massive signaling along with significant radio resource consumption.

The ProSe function terminology used herein may be a network function or a node that is part of a 5G core network, for example. The ProSe function may be a separate distinct network function, or a function co-located in one network entity (e.g., PCF), or the functionality and the behavior described herein may be split across different network functions in a core network. For example, the PCF may be responsible for ProSe configuration provisioning whereas the AMF or SMF may be responsible for the ProSe discovery procedure. The embodiments described herein may assume interactions between the WTRU and the ProSe function (e.g., network) using the control plane path. It may however also be possible that the WTRU interacts with the ProSe function over a user plane.

Figure 5:
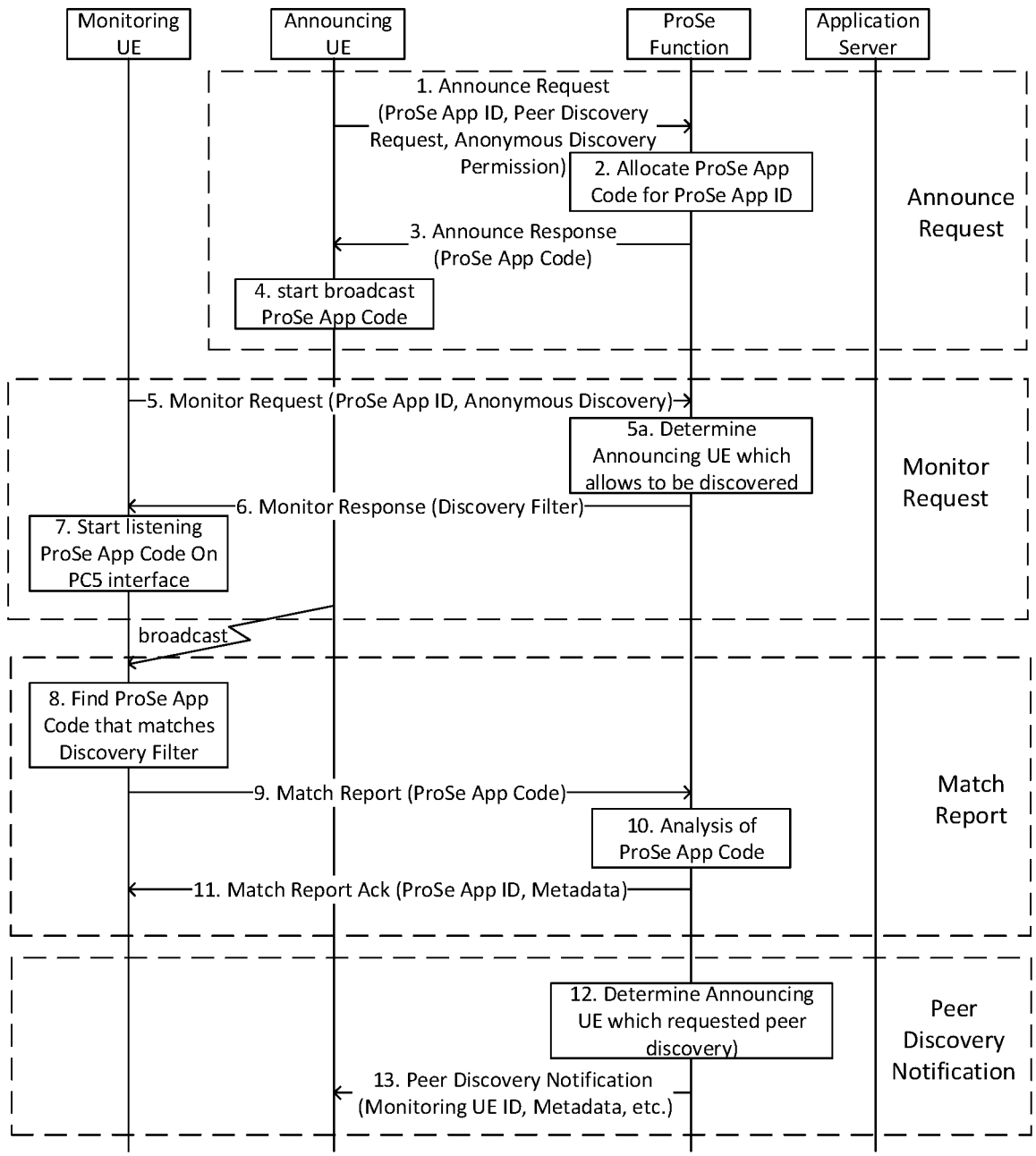
FIG. 5 is a diagram illustrating an example of a procedure of ProSe Peer Node Discovery according to an embodiment.

FIG. 5 illustrates one embodiment relating to the Model A ProSe discovery procedure. As shown in FIG. 5, the announcing WTRU 502 may indicate that peer node discovery is required when sending an announce request 504 to the ProSe function 506. Once the ProSe function 506 receives the match report request from a monitoring WTRU 508, which indicates the monitoring WTRU 508 has discovered the announcing WTRU 502, the ProSe function 506 may notify the announcing WTRU 502 that it has been discovered by the monitoring WTRU 508 and the ProSe function 506 may provide the monitoring WTRU 508 information to the announcing WTRU 502.

In the embodiment illustrated in FIG. 5, the monitoring WTRU 508 may indicate whether it can be discovered by the announcing WTRU 502, such as whether to allow the ProSe function 506 to provide the monitoring WTRU's 508 information to the announcing WTRU 502.

In one example, the announcing WTRU 502 may have the following behavior: send ProSe app ID and peer discovery request indication to the ProSe function 506 in the announce request message, where optionally, the announcing WTRU 502 may indicate whether it allows itself to be discovered anonymously by an anonymous discovery permission (e.g., allowed or not allowed), such as whether the announcing WTRU 502 can be discovered without peer discovery notification and; receive ProSe app code from ProSe function 506 and broadcast the ProSe app code on a radio interface; and/or receive peer discovery notification from ProSe function 506, where the peer discovery notification may include the monitoring WTRU ID, monitoring WTRU lay 2 address, monitoring WTRU location, and other similar attributes.

In yet another example, the monitoring WTRU 508 may have the following behavior: send monitor request to the ProSe function 506, where the monitor request may include an anonymous discovery indication, which indicates whether the monitoring WTRU's information can be sent from the ProSe function 506 to the announcing WTRU 502; and/or, receive discovery filter from the ProSe function 506 and listens the ProSe app code on a radio interface, where the monitoring WTRU 508 sends a match report to the ProSe function 506 when detecting a ProSe app code matching the discovery filter.

In yet another example, the ProSe function 506 may have the following behavior: receive a peer discovery request indication from the announcing WTRU 502 and optionally with anonymous discovered permission (e.g., allowed or not allowed), allocate the ProSe app code, and send the ProSe app code to the announcing WTRU 502; and receive a monitor request from the monitoring WTRU 508, which may include the anonymous discovery indication. If the monitoring WTRU 508 does not allow the ProSe function 506 to send its information to the announcing WTRU 502 and the announcing WTRU 502 does not allow anonymous discovery, the ProSe function 506 will not send the ProSe app code of the announcing WTRU 502 to the monitoring WTRU 508 in monitor response message. Otherwise, the ProSe function 506 will send the ProSe app code to the monitoring WTRU 508.

Also, when the ProSe function 506 is receiving the match report from the monitoring WTRU 508, the ProSe function 506 may determine the announcing WTRU(s) 502 that requested peer discovery. In this case, the ProSe function 506 may send peer discovery notification to the announcing WTRU(s) 502, which may include the monitoring WTRU ID, application ID, monitoring WTRU's address, the monitoring WTRU's location, metadata, and similar attributes.

The overall procedure for an embodiment of Model A (FIG. 5) and the differences from FIG. 3 may include the following: in step 1, the announcing WTRU includes peer discovery request indication, and optionally anonymous discovery permission, in the announce request message; in step 5, the monitoring WTRU may include an anonymous discovery indication in the monitor request; in step 5a, the ProSe function determines whether the announcing WTRU allows to be discovered by the monitoring WTRU based on anonymous discovery permission from announcing WTRU and anonymous discovery indication from the monitoring WTRU; in step 12, when receiving match report from the monitoring WTRU, the ProSe function determines which announcing WTRU(s) requested the peer discovery; and, in step 13, the ProSe function sends the monitoring WTRU's information, such as monitoring WTRU ID, application ID, metadata, location, discovered time, to the announcing WTRU which requested peer discovery, then the announcing WTRU obtains the monitoring WTRU's info from the message.

Figure 6:
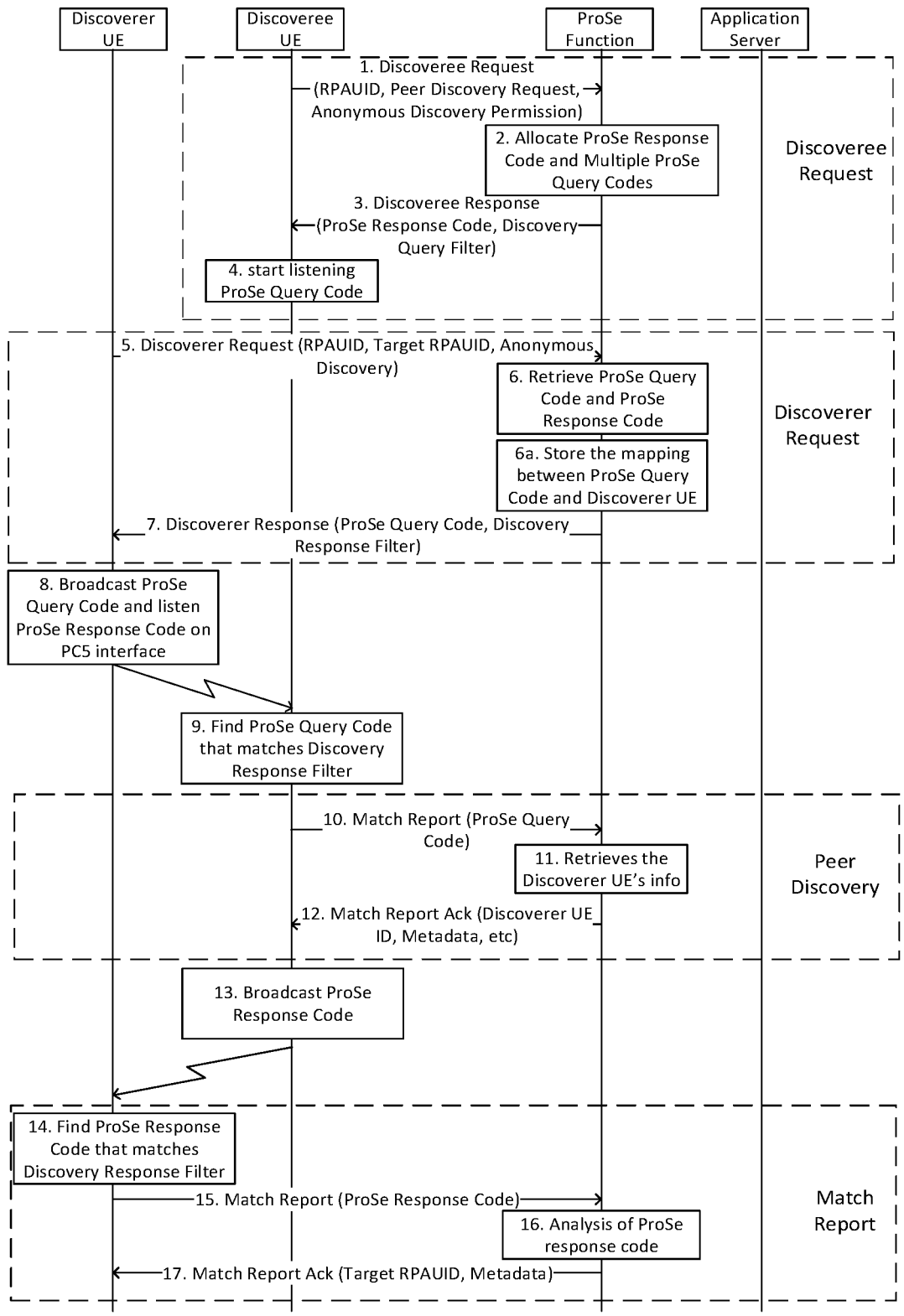
FIG. 6 is a diagram illustrating an example of a procedure of ProSe Peer Node Discovery according to an embodiment.

FIG. 6 illustrates one embodiment relating to the Model B ProSe discovery procedure. As shown in FIG. 6, the discoveree WTRU 602 may indicate that peer node discovery is required when sending a discoveree request 608 to the ProSe function 604. Once the ProSe function 604 receives a match report request from the discoverer WTRU 606 which indicates that the discoverer WTRU 606 discovered the discoveree WTRU 602, the ProSe function 604 may notify the discoveree WTRU 602 that it's discovered by the discoverer WTRU 606 and the ProSe function 604 may provide the discoverer WTRU 606 information to the discoveree WTRU 602. This embodiment may use a similar principle as the embodiment described in conjunction with the example of FIG. 5.

In another approach, the discoveree WTRU 602 may indicate that peer node discovery is required when sending a discoveree request to the ProSe function 604. If peer node discovery is required, the ProSe function 604 allocates multiple ProSe query codes for possible discoverer WTRUs 606. One or multiple discovery query filters may be sent to the discoveree WTRU 602, which starts monitoring for all of them. When the ProSe function 604 receives a discoverer request from the Discoverer WTRU 606, the ProSe function 604 may send a unique ProSe query code for the discoverer WTRU 606 and stores the mapping between the ProSe query code and the discoverer WTRU 606. Then the discoverer WTRU 606 may broadcast the unique ProSe query code on the radio interface. When the discoveree WTRU 602 detects the ProSe query code on radio interface which matches the discovery query filter, the discoveree WTRU 602 may send a match report to ProSe function 604 with the ProSe query code. Then the ProSe function 604 may retrieve the discoverer WTRU's 606 information based on the unique ProSe query code and send the information to the discoveree WTRU 602.

In one example, the discoveree WTRU 602 may have the following behavior: send peer discovery request indication to the ProSe function 604 in the discoveree request message, where optionally, the discoveree WTRU 602 may indicate whether it allows to be discovered anonymously by an anonymous discovery permission (e.g., allowed or not allowed), such as whether the discoveree WTRU 602 can be discovered without peer discovery; receive ProSe response code and one or multiple Discovery Query Filters from ProSe function and listens ProSe query code on radio interface wherein the discoveree WTRU 602 broadcasts the ProSe response code and sends match report to the ProSe function 604 which includes the ProSe query code when detecting a ProSe query code which matches the Discovery Query Filter; and receive a match report acknowledgement from the ProSe function 604, which may include the discoverer WTRU ID, application user ID, metadata, or similar attributes.

In yet another example, the discoverer WTRU 606 may have the following behavior: send a discoverer request to the ProSe function 604, where the discoverer request may include anonymous discovery indication, which indicates whether the discoverer WTRU's information can be sent from ProSe function 604 to the discoveree WTRU 602; receive ProSe query code and discovery response filter from the ProSe function 604; broadcast ProSe query code and listens the ProSe response code on radio interface; and send match report to the ProSe function 604 when detecting a ProSe response code which matches the discovery response filter.

In yet another example, the ProSe function 604 may have the following behavior: receive a peer discovery request indication from the discoveree WTRU 602 optionally with anonymous discovered permission (e.g., allowed or not allowed), allocate ProSe response code and/or multiple ProSe query codes for possible discoverer WTRUs 606 and associated discovery query filter(s), and send ProSe response code and discovery query filter(s) to the discoveree WTRU 602 and receive discoverer request from the discoverer WTRU 606, which may include the anonymous discovery indication. The ProSe function will not send ProSe query code to the discoverer WTRU if the discoverer WTRU does not allow the ProSe function to send its information to the discoveree WTRU and the discoveree WTRU does not allow anonymous discovery; otherwise, sends a ProSe query code to the discoverer WTRU; store the mapping between the ProSe query code and the discoverer WTRU 606. When receiving the match report from the discoveree WTRU 602, the ProSe function 604 may determine discoverer WTRU 606 based on the ProSe query code, and then send the discoverer WTRU's information to the discoveree WTRU.

The overall procedure for an embodiment of Model B (FIG. 6) and the differences from the FIG. 4 may include the following: in step 1, the discoveree WTRU includes peer discovery request indication, and optionally anonymous discovery permission, in the discoveree request message; in step 2, the ProSe function allocates multiple ProSe query codes for the discoveree WTRU; in step 5, the discoverer WTRU may include an anonymous discovery indication in the discoverer request; in step 6a, the ProSe function stores the mapping between the ProSe query code and the discoverer WTRU; in step 10-12, after detecting ProSe query code which matches the discovery query filter, the discoveree WTRU sends match report to the ProSe function, in which the detected ProSe query code is included, then the ProSe function retrieves the discoverer WTRU based on the mapping between ProSe query code and discoverer WTRU. The ProSe function may send discoverer WTRU's information to the discoveree WTRU, which may include discoverer WTRU ID, application user ID, metadata, or other similar attributes.

Although features and elements are described above in particular combinations, one of ordinary skill in the art will appreciate that each feature or element can be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:

1. A method implemented in a first wireless transmit receive unit (WTRU), the method comprising:
    sending an announce request to a node residing in a cellular core network;
    sending a proximity service (ProSe) app code to enable a second WTRU to discover the first WTRU; and
    receiving a peer discovery notification from the node;
    wherein the announce request includes an indication that the first WTRU is requesting peer discovery and an indication that the first WTRU is anonymously discoverable.

2. The method of claim 1, wherein the node is a ProSe function.

3. The method of claim 1, wherein the first WTRU is an announcing WTRU.

4. The method of claim 1, wherein the second WTRU is a monitoring WTRU.

5. The method of claim 1, wherein the peer discovery notification includes information related to the second WTRU including at least one of the second WTRU's ID, layer 2 address, or location.

6. The method of claim 1, further comprising:
    receiving an announce response, from the node, after sending the announce request to the node.

7. A first wireless transmitter receiver unit (WTRU) comprising:
    a transmitter; and
    a receiver
    wherein the transmitter is configured to send an announce request to a node residing in a cellular core network;
    wherein the transmitter is further configured to send a proximity service (ProSe) app code to enable a second WTRU to discover the first WTRU;
    wherein the receiver is configured to receive a peer discovery notification from the node; and
    wherein the announce request includes an indication that the first WTRU is requesting peer node discovery and an indication that the first WTRU is anonymously discoverable.

8. The first WTRU of claim 7, wherein the transmitter is configured to send the announce request to a ProSe function.

9. The first WTRU of claim 7 configured to be an announcing WTRU.

10. The first WTRU of claim 7, wherein the transmitter is configured to send the ProSe app code to a monitoring WTRU.

11. The first WTRU of claim 7, wherein the peer discovery notification received by the receiver comprises information relating to the second WTRU, including at least one of the second WTRU's ID, layer 2 address, or location.

12. The first WTRU of claim 7, wherein the receiver is further configured to receive an announce response upon sending the announce request to the node.

* * * * *